(12) United States Patent
Castro

(10) Patent No.: US 8,485,321 B2
(45) Date of Patent: Jul. 16, 2013

(54) ELECTRONIC BRAKE ASSEMBLY FOR A BICYCLE

(76) Inventor: Ursi Castro, Jacksonville, FL (US)

( * ) Notice: Subject to any disclaimer, the term of this patent is extended or adjusted under 35 U.S.C. 154(b) by 574 days.

(21) Appl. No.: 12/633,206

(22) Filed: Dec. 8, 2009

(65) Prior Publication Data

US 2010/0170753 A1    Jul. 8, 2010

Related U.S. Application Data

(60) Provisional application No. 61/121,470, filed on Dec. 10, 2008.

(51) Int. Cl.
*B62L 3/00* (2006.01)
(52) U.S. Cl.
USPC ............... 188/24.22; 188/72.8; 188/1.11 R
(58) Field of Classification Search
USPC .............. 188/1.11 R, 24.11–24.17, 72.8
See application file for complete search history.

(56) References Cited

U.S. PATENT DOCUMENTS

| 4,263,990 | A | | 4/1981 | Yoshigai | |
|---|---|---|---|---|---|
| 4,765,443 | A | | 8/1988 | Cunningham | |
| 4,838,387 | A | * | 6/1989 | Yoshigai | 188/24.21 |
| 5,816,352 | A | | 10/1998 | Hacker | |
| 5,924,507 | A | | 7/1999 | Prather | |
| 6,098,763 | A | * | 8/2000 | Holding | 188/158 |
| 6,302,242 | B1 | * | 10/2001 | Mao | 188/24.21 |
| 7,337,883 | B2 | * | 3/2008 | Geyer | 188/156 |
| 7,549,356 | B2 | | 6/2009 | Leuschke et al. | |
| 2002/0134604 | A1 | | 9/2002 | Lan | |
| 2008/0114519 | A1 | * | 5/2008 | DuFaux et al. | 701/70 |
| 2009/0078512 | A1 | | 3/2009 | Edwards et al. | |
| 2010/0170753 | A1 | | 7/2010 | Castro | |
| 2010/0194187 | A1 | | 8/2010 | Howard | |

FOREIGN PATENT DOCUMENTS

| DE | 19537394 | | 8/1996 |
|---|---|---|---|
| DE | 10017576 | A1 * | 9/2001 |
| GB | 2453106 | | 4/2009 |
| JP | 60-056691 | | 4/1985 |
| JP | 08-140212 | | 5/1996 |
| JP | 2006082740 | | 3/2006 |
| JP | 2008-168751 | | 7/2008 |
| WO | WO 2004/075456 | | 9/2004 |

* cited by examiner

*Primary Examiner* — Xuan Lan Nguyen
(74) *Attorney, Agent, or Firm* — Leason Ellis LLP

(57) ABSTRACT

An electronic brake device for use with a wheel of a bicycle provides, among other features, wireless, remote disengagement of a wheel brake. A brake coupled to a housing is movable between an engaged position and a disengaged position. The housing includes a receiver configured to receive a command signal, and a processor operative to identify the received command signal. If the command signal is identified as a first command signal, the processor outputs a first control signal. An electric motor is operatively coupled to the brake to selectively move the brake from the engaged position in which the wheel of the bicycle is being braked to the disengaged position in which the wheel of the bicycle is free of any brake contact in response to the first control signal. Measured movement of the brakes between fully braked or fully disengaged positions are possible in the disclosed arrangement.

12 Claims, 12 Drawing Sheets

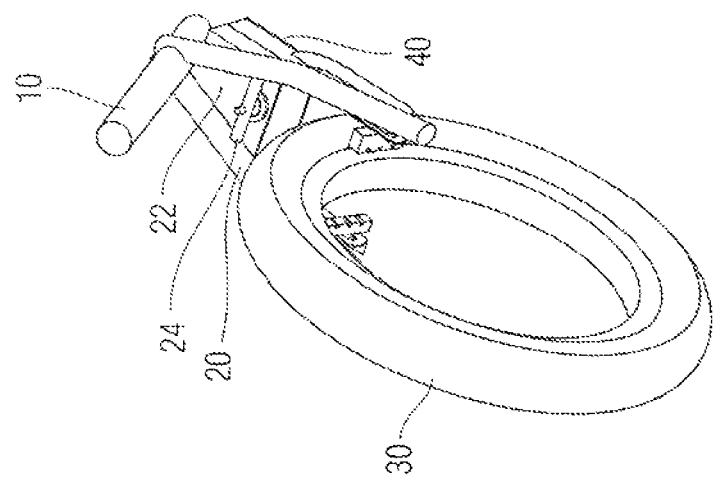
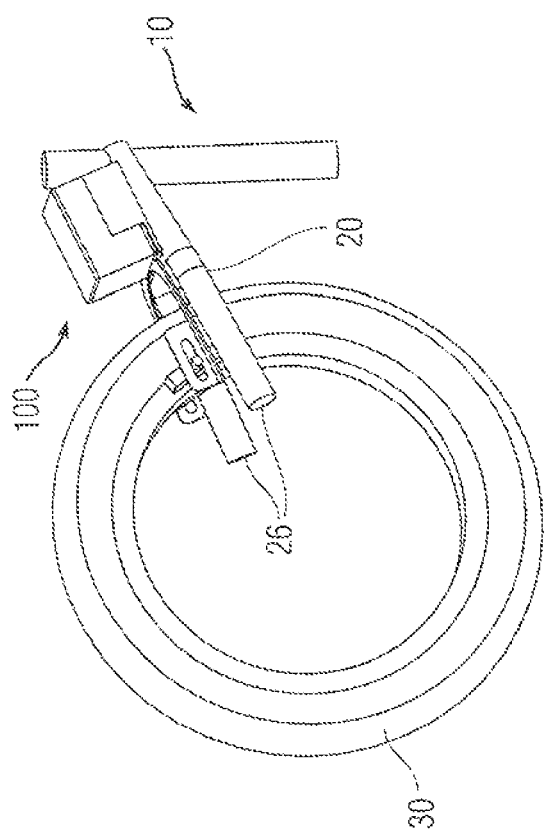
Fig. 2A
Fig. 2B

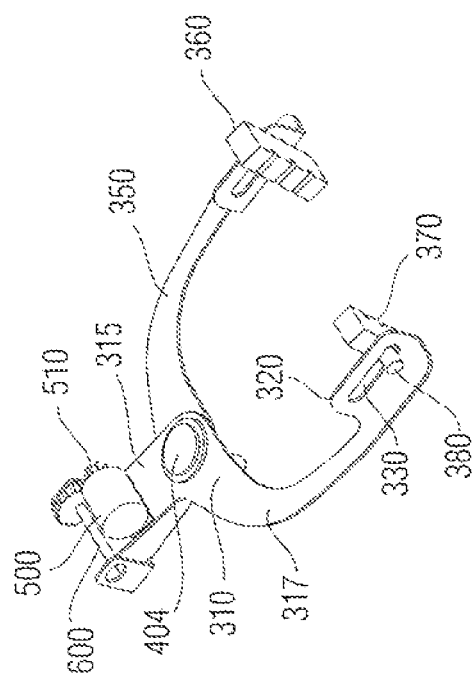
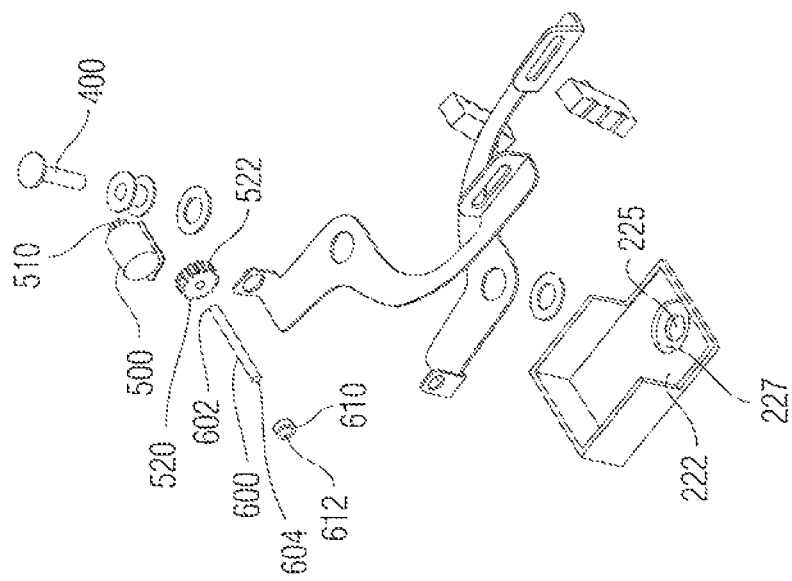
Fig. 4
Fig. 5A

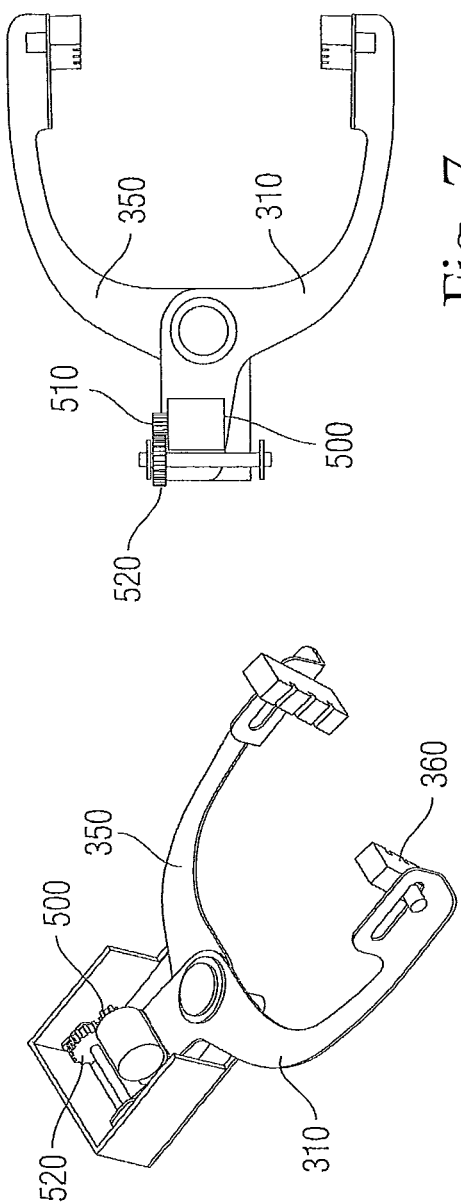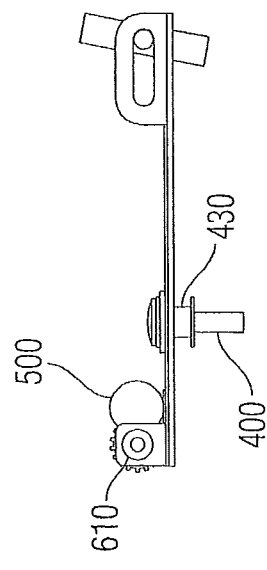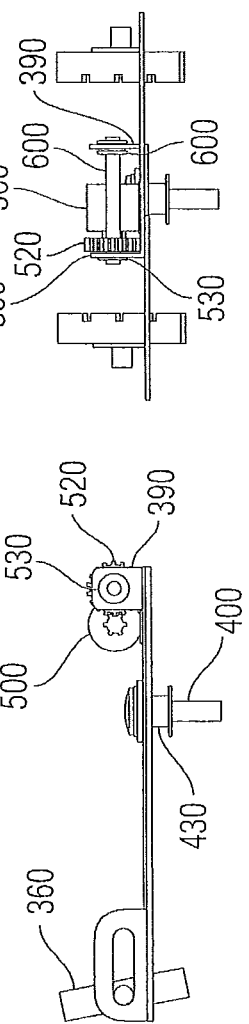

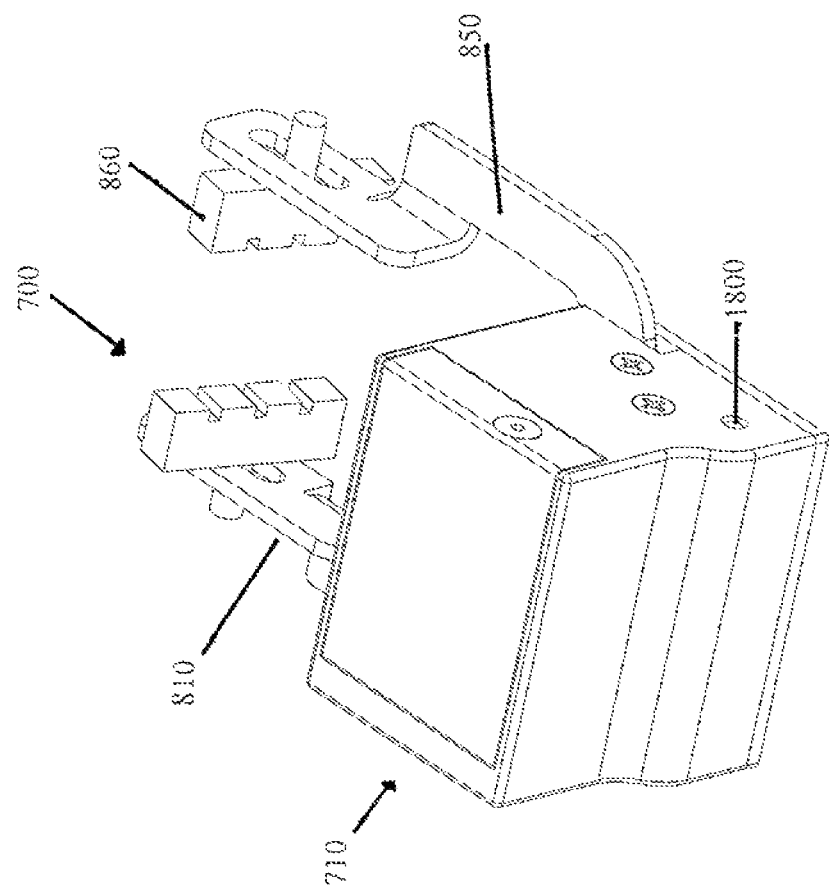

ELECTRONIC BRAKE ASSEMBLY FOR A BICYCLE

CROSS REFERENCE TO RELATED APPLICATIONS

The present application claims benefit to U.S. Patent Application Ser. No. 61/121,470, filed Dec. 10, 2008, which is hereby incorporated by reference in its entirety.

TECHNICAL FILED OF THE INVENTION

The present invention relates to brake devices and in particular, to a remote control brake that can be easily attached to a child's bicycle to allow a parent to monitor the child and use a remote control to apply the rear brake to stop the bicycle remotely and safely in the event that the child fails to see a hazard or fails to obey the commands of the parent, is not in control of the bicycle, or has bicycled too far away from the parent.

BACKGROUND OF THE INVENTION

One traditional toy that is enjoyed by not only children but also adults is a bicycle. There are a number of different types of bicycles that are designed for young children to assist them in learning how to ride a bicycle. Two of the more common bicycles are a bicycle equipped with training wheels and a bicycle equipped with a coaster type brake. Most times, a child's first true bicycle is of a coaster brake type that includes training wheels to assist the child in learning how to ride the bicycle. Training wheels, which are also known as stabilizers, are an additional wheel or wheels mounted parallel to the rear wheel of a bicycle that assists learners until they have developed a usable sense of balance of the bicycle. A coaster brake, which can also be referred to as a back pedal brake, is a type of drum brake which is integrated into hubs having an internal freewheel. Freewheeling functions as with other systems, but, when back pedaled, the bake engages after a fraction of a revolution. The bicycle is stopped by the child back pedaling, thereby causing the brake to be applied.

Even though coaster brakes can be effective in stopping the bicycle, there are a number of concerns that parents have when a child uses such beginning bicycles and in particular, when a child is first learning to ride a bicycle. First, the child may get confused or scared and simply forget how to apply the coaster brake in which case the child is essentially riding on a runaway bicycle. Second, a child may not appreciate or fail to recognize a particular hazard, such as a car approaching, and thus is unaware that the brake must be applied in order to avert such dangerous situation. Third, when going down a slight decline, the child may get scared as the bicycle picks up speed and is simply overcome with fear and unable to apply the brake in a controlled manner. Countless other hazards potentially face a child beginning to learn how to ride a bicycle.

As a result, the learning of how to ride a bicycle can be not only potential dangerous for a child but also very unnerving for the parent. There is therefore a need for a device that can allow a parent better control over a child who is learning to ride a bicycle.

SUMMARY OF THE INVENTION

In accordance with one aspect of the invention, an electronic brake device for use with a wheel of a bicycle provides, among other features, wireless, remote disengagement of a wheel brake.

In a more particular aspect of the invention, a brake is coupled to a housing and movable between an engaged position and a disengaged position. The housing includes a receiver configured to receive a command signal, and a processor operative to identify the received command signal. If the command signal is identified as a first command signal, the processor outputs a first control signal. An electric motor is operatively coupled to the brake to selectively move the brake from the engaged position in which the wheel of the bicycle is being braked to the disengaged position in which the wheel of the bicycle is free of any brake contact in response to the first control signal.

In yet another aspect of the invention, an electronic brake device for use with a wheel of a bicycle comprises a first brake caliper having a first end and a second end that contains a brake pad and a second brake caliper having a first end and second end that contains a brake pad. The first and second brake calipers are pivotally coupled to one another. A housing has an electric motor disposed therein and is mounted to the first brake caliper. A first gear is driven by the electric motor and a gear mechanism is intimately coupled to the first gear and is also coupled to both the first and second brake calipers. Activation of the electric motor drives the gear mechanism to cause the first and second brake calipers to move between an engaged position and a disengaged position. A receiver is configured to receive a remote command signal and activate the electric motor.

In still another aspect of the invention, a remote-controlled electronic brake system for use with a wheel of a bicycle comprises an electronic brake assembly and a remote control unit. The electronic brake assembly includes a housing that can be detachably coupled to a frame of the bicycle, a receiver configured to receive a command signal, a processor disposed within the housing and operative to identify the received command signal and to output a first control signal in response to the command signal being identified as a first command signal, a first brake caliper that includes a brake pad, a second brake caliper that includes a brake pad, an electric motor disposed within the housing, and a gear mechanism that is intimately coupled to the electric motor and is coupled to both the first and second brake calipers. Activation of the electric motor drives the gear mechanism to cause the first and second brake calipers to move between an engaged position and a disengaged position. The remote control unit is configured to issue one or more command signals that remotely activate the electric motor assembly so as to cause the brake calipers to move between the engaged position and the disengaged position.

These and other aspects, features and advantages shall be apparent from the accompanying Drawings and description of certain embodiments of the invention.

BRIEF DESCRIPTION OF THE DRAWINGS

FIG. 2A is a side perspective view of the device of FIG. 1 installed on a rear tire of a bicycle;

FIG. 2B is a side perspective view of the device of FIG. 1 installed on the rear tire;

FIG. 4 is a top and side perspective view of a remote controllable caliper assembly of the brake device;

FIG. 5A is another exploded perspective view of the caliper assembly;

FIG. 6 is a perspective view of the assembly and compartment of FIG. 5 in an assembled condition;

FIG. 7 is a top plan view of the caliper assembly in an assembled condition;

FIG. 8 is a right side elevation view of the assembly of FIG. 7;

FIG. 9 is a left side elevation view of the assembly of FIG. 7;

FIG. 10 is a perspective view of a remote control brake device according to one embodiment for a bicycle;

FIG. 16 is an end view of the assembly of FIG. 7.

DETAILED DESCRIPTION OF CERTAIN EMBODIMENTS OF THE INVENTION

Figure 1:
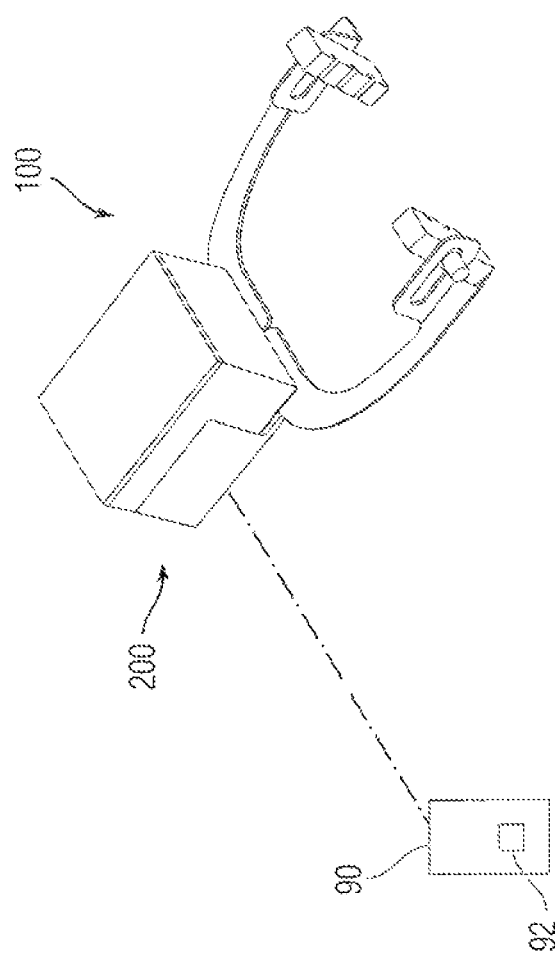
FIG. 1 is a top and side perspective view of a remote control brake device according to one embodiment for a bicycle.

FIG. 1 illustrates a remote control (electronic) brake device 100 for use with a bicycle, especially a child's bicycle. FIGS. 2A and 2B illustrate the brake device 100 mounted on a frame 10 of a bicycle. The frame 10 includes a rear fork 20 that defines a space 22 that receives a portion of a tire 30 and therefore, the rear fork 20 at least partially surrounds the tire 30. It will be appreciated that a number of components of the frame 10, as well as other components, are not illustrated for ease of illustration.

Typically, the rear fork 20 includes a cross member 24 that extends between the arms 26 of the rear fork 20. The cross member 24 and the arms 26 are often tubular metal pieces that are attached to one another, e.g., by welding. It is standard for the cross member 24 to have an opening or bore 40 formed therethrough to allow for subsequent installation of a conventional brake device that is actuated at the handlebars of the bicycle. Conveniently, the brake device 100 can be mounted to the cross member 24 to position the brake device 100 relative to the tire 30 to permit controlled braking and stopping of the tire 30. A fastener, such as a bolt, can be used to mount the brake device 100 by disposing the fastener through the bore 40 and a nut or the like can be used to fasten the brake device 100 to the frame 10. Alternatively, the bore 40 can be a threaded bore and the fastener threadingly engages the cross member 24.

Figure 3:
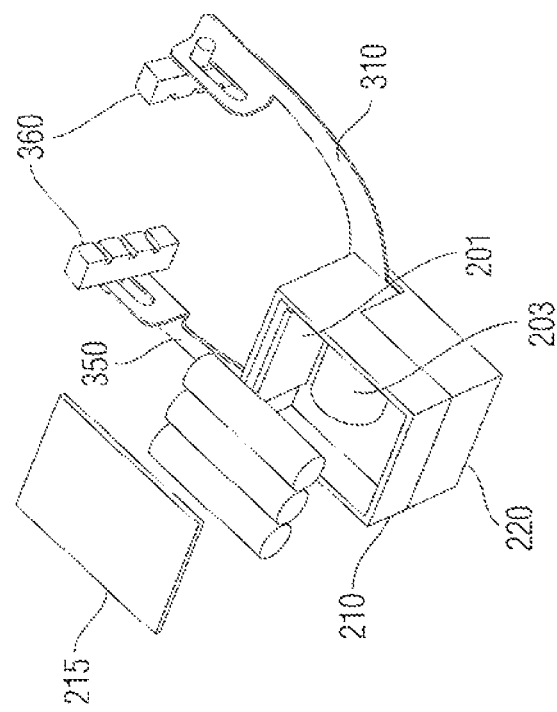
FIG. 3 is an exploded top perspective view of the device of FIG. 1 illustrating a compartment for holding a power source.
Figure 5:
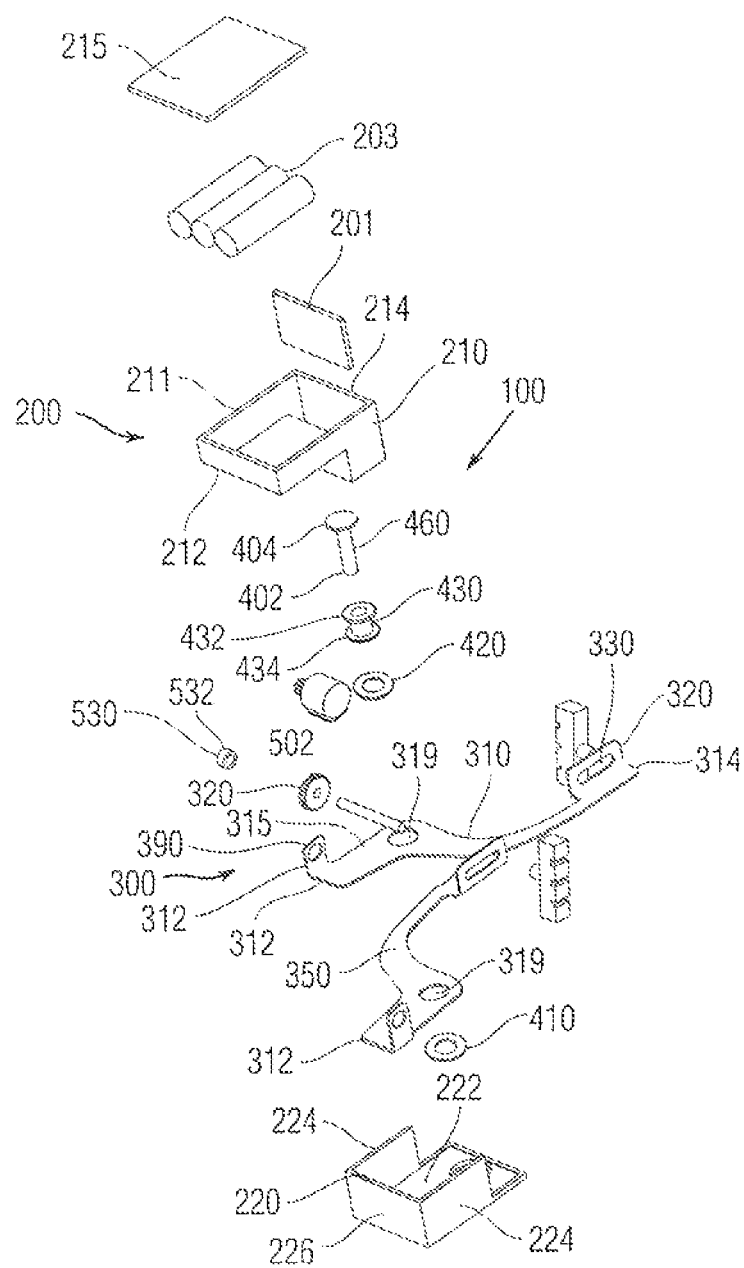
FIG. 5 is an exploded perspective view of the caliper assembly and power source compartment.

FIGS. 3 and 5 and 5A illustrate components of the brake device 100 and in particular, the brake device 100 includes a housing 200 that stores a power source 203 such as batteries or a rechargeable fuel cell in a battery receptacle, with the power source electrically connected to circuitry configured to implement remote, wireless braking of the wheel of a bicycle. The housing also includes an electronically actuated caliper brake assembly 300. The housing 200 includes a first part 210 and a complementary second part 220. The first part 210 can be thought of as a top part, while the second part 220 can be thought of as a bottom part. The first part 210 is a substantially hollow member that defines an inner compartment 211 for holding the power source 203. The inner compartment 211 includes a first section 212 and an adjacent second section 214. The second section 214 has a greater depth than the first section 212. As shown in FIG. 5, the first part 210 generally has an L shape with the first section 212 representing the larger section and the second section 214 representing the smaller section.

The second part 220 is complementary to the first part 210 and includes a base or floor 222 that is at least partially surrounded by a pair of side walls 224 and an end wall 226. The end wall 226 is located at one end of the floor 222 and the side walls 224 attach at ends to the end wall 226 and terminate prior to the other end of the floor 222 such that the floor 222 is open along one end thereof. The floor 222 includes an opening 225 formed therethrough in the region where the side walls 224 are absent. The opening 225 is surrounded by a circular shaped recess 227 that is formed in the floor 222 such that the opening 225 is formed in the middle thereof. The length of the side walls 224 is selected so that when the first and second parts 210, 220 are mated together, the second section 214 fits in the region where the side walls 224 are absent. The underside of the first section 212 seats against the top edges of the side walls 224.

As best shown in FIG. 5, the power source 203 can be in the form of a plurality of batteries that are disposed in the first section 212 and extend across a top portion of the second section 214. The batteries 210 are thus contained within the inner compartment 211. The brake device 100 also includes circuitry including a receiver, a processor, and supportive components such as a signal amplifier, latch, capacitor and/or inductor, in order to provide control signals to the electric motor in connection with actuation of the motor to fully or partially engage the brake, or to disengage the brake. A printed circuit board (PCB) 201 disposed within the first part 210 supports some or all of these components. In FIG. 5, the PCB 201 is a square or rectangular shaped member that is disposed within the second section 214 of the first part 210. The power source 203 is operatively (electrically) connected to the PCB 201 and provides current and voltage to the remaining circuitry. A top cover 215 is used to close off the inner compartment 211 and can be attached to the first part 210 using conventional techniques. FIG. 3 shows the PCB 201 inserted into the second section 214 of the first part 210 and the batteries 210 are positioned for placement in the inner compartment 211.

FIGS. 4 and 5 illustrate the caliper brake assembly 300 in more detail. The caliper brake assembly 300 includes a number of components that interact and are coupled to one another. The caliper brake assembly 300 includes a first brake caliper 310 and a second brake caliper 350 that can be a mirror image thereof as shown. The first brake caliper 310 includes a first end 312 and an opposing second end 314. The first brake caliper 310 has a base section 315 that terminates at the first end 312 and a bent or curved section 317 that terminates at the second end 314. At or near the location where the base section 315 merges with the curved section 317, an opening 319 is formed through the first brake caliper 310 and represents a pivot point for the first and second brake calipers 310, 350. The opening 319 can have a circular shape.

At the second end 314, an upstanding first flange 320 is formed. The flange 320 includes a slot 330, such as a longitudinal slot. The first flange 320 can be formed perpendicular to the base section 315.

The first and second calipers 310, 350 can be formed of a number of different materials, including metals or other materials.

A brake pad 360 is provided and is intimately inserted into and held within the slot 330. The brake pad 360 can be a conventional brake pad that includes a friction body 370 that is placed in contact with a rim of the tire 30 to cause braking of the bicycle by stopping rotation of the tire 30. The friction body 370 can be a rubber body and the brake pad 360 includes a stem or post 380 that extends radially outward from the friction body 370. The stem 380 is inserted into the slot 330 for coupling the brake pad 360 to the first caliper 310. It will be appreciated that the brake pad 360 can be adjusted not only longitudinally along the first caliper 310 at the second end 314 by moving the stem 380 longitudinally within the slot 330 but also the brake pad 360 can be pivoted relative to the first caliper 310. For example, the stem 380 has a cylindrical shape and therefore, it can be rotated within the slot 330, thereby permitting the brake pad 360 to also rotate. By allowing the brake pad 360 to be moved longitudinally within the slot 330 and also be pivoted within the slot 330, the brake pad 360 can be adjusted relative to the particular type of tire 30 that is present on the bicycle. More particularly, different bicycles have different tires sizes and therefore, the location of the tire's rim can differ from tire to tire, thereby necessitating some ability to adjust the brake pad 360 relative to the tire 30 to allow a proper fit between the brake and the tire.

The first end 312 also includes a second upstanding flange 390. Like the first flange 320, the second flange 390 can be formed perpendicular to the base section 315. The second flange 390 is not as big as the first flange 390 but it does include an opening or slot 392 formed therein for receiving a member as described below. In the illustrated embodiment, the opening 392 has a circular shape. Both the first flange 320 and the second flange 390 are formed along the inner edge of the caliper 310.

As mentioned above, the second caliper 350 is a mirror image of the first caliper 310 and therefore, like elements have been numbered alike. In particular, the second caliper 350 includes the same components as the first caliper 310 and therefore, the same components have been numbered the same.

As shown in FIG. 4, when the first and second calipers 310, 350 are mated together, the first caliper 310 is disposed at least partially over the second caliper 350 and in particular, the base section 315 of the first caliper 310 is disposed over the base section 315 of the second caliper 350 such that the openings 319 of the two calipers are axially aligned with one another. The two calipers 310, 350 are pivotally attached to one another using a fastener 400, such as a pin, as shown. The pin 400 includes a shaft 402 and a head 404 at one end. A first washer 410 is received within the circular shaped recess 227 that is formed in the floor 222. The opening in the washer 410 is thus aligned with the opening 225. The washer 410 is sized to sit within the circular shaped recess 227. A second washer 420, preferably identical to the first washer 410 is provided. The pin 400 is inserted into the opening of the second washer 420 such that the second washer 420 is disposed against the head 404 of the pin 400. The second washer 420 thus seats against a top surface of the base section 315 of the first caliper 310.

A spacer 430 is also provided and is disposed underneath the second part 220. The spacer is generally hour glass shaped and includes a central bore 432 formed therethrough for receiving the pin 400. At opposing ends of the spacer 430, flanges 434 are formed. One flange 434 seats against the underside of the second part 220 with the bore 432 being axially aligned with the opening 225. The other flange 434 seats against the cross member 24 that is part of the frame 10. The pin 400 can be a threaded bolt that fasteningly attaches to the cross member 24, thereby attaching the brake device 100 to the frame 10. The spacer 430 is thus designed to space the housing 200 a prescribed distance from the cross member 24.

By passing the pin 400 through the axially aligned openings 319 of the at least partially overlapping base sections 315, each of the first and second calipers 310, 350 pivot about the pin 400 between a retracted position in which the second ends 314 of the calipers 310, 350 are spaced farthest apart and an engaged position in which the second ends 314 of the calipers 310, 350 are spaced closer to one another. In this manner, the brake pads 360 are moved either in a direction towards the tire or away from the tire. When assembled, the first and second calipers 310, 320 assume a wishbone shape.

Referring to FIGS. 4-9, the brake assembly 300 also includes an electronic drive component, as well as a gear mechanism 305 for opening and closing the calipers 310, 350.

For example, the brake assembly 300 can include an electronic motor 500 that is mounted on the base section 315 of the first caliper 310. In particular, the motor 500 is arranged so that a drive shaft that includes a first gear 510 faces the inner edge of the first caliper 310. The first gear 510 can be of spur gear type that has teeth formed along an outer periphery of the gear.

More specifically, the motor 500 is disposed across the base section 315 and preferably, the length of the motor 500 is about equal to or less than a width of the base section 315. The motor 500 can be attached to the base section 315 using traditional techniques, including fasteners, bonding, adhesives, etc. When mounted, the first gear 510 is proximate to, aligned with or slightly protruding beyond the inner edge of the first caliper. The motor 500 is mounted such that it is disposed adjacent the second flange 390.

The brake assembly 300 and in particular, the motor 500 thereof, is electrically connected to the PCB 201 and is powered by the power source 203 in response to a first control signal to actuate the electric motor. The first control signal is preferably issued by the processor. The processor operates upon wireless command signals received at a receiver so as to identify the nature of the command (e.g., a command to partially engage the brake, fully engage the brake, or disengage the brake). The processor outputs a control signal as a function of the identified command in one embodiment of the invention. In such an embodiment, a first control signal can be provided to actuate the electric motor and cause it to disengage the brake. Also, in such an embodiment, further control signals can be provided by the processor in order to partially engage the brake or to fully engage the brake, and depending on the signal the motor is actuated, for instance, to turn in a certain direction (e.g., the opposite direction than when it is disengaging the brake), or to turn a certain amount (e.g., a little to slow the bicycle gradually or a lot to stop the bicycle more quickly). Thus, for instance, a second control signal can be identified by the processor and used to partially engage the brake and a third control signal can be identified by the processor and used to fully engage the brake.

In another embodiment, a single control signal can be issued to intermittently engage or disengage the brake. In this embodiment, a flip-flop or the like can be used to maintain state information and permit the same wireless command signal from a remote control to cause two different motor actuations (e.g., spin one way, then spin the next to effect brake engagement and disengagement). By monitoring the transmission time of such a command signal, further logic can be used in the circuitry to provide enhanced operation such as partial engagement for gradual stopping.

The first gear 510 associated with the motor 500 intimately engages (meshes) with a second gear assembly to cause controlled movement of the calipers 310, 350. For example, the second gear assembly is actually coupled (mounted) to both the first and second calipers 310, 350 as described below to cause the desired movement between the brake pads 360 (retracted and engaged positions). The second gear assembly includes a second gear 520 that is complementary to the first gear 510 and has teeth formed about its outer surface that interlockingly mesh with the teeth of the first gear 510. The second gear 520 includes a center bore 522 formed therethrough and which can be in the form of a threaded bore. The second gear 520 is mounted to the second flange 390 by a first hub 530 or the like that has a cylindrical shape to allow it to seat within the opening 392 formed in the second flange 390 such that it is prevented from rotating.

Thus, the first hub 530 can have a pair of annular shaped flanges at its ends to assist in coupling the first hub 530 to the second flange 390. In particular, when the first hub 530 is coupled to the second flange 390, the two flanges are disposed on the two opposing faces of the second flange 390 to lock the first hub 530 in place. The first hub 530 also has a center bore 532 formed therethrough and which can be in the form of a threaded bore.

As described below, when mounted, the first hub 530 is disposed within the opening 392 formed in the second flange 390 of the first caliper 310 and the second gear 520 is disposed proximate an inner surface of the second flange 390 which faces the opposing second flange 390 that is part of the second caliper 350.

Another part of the gear mechanism 305 is a threaded rod or shaft 600 and in one embodiment the mechanism for translating the drive action of the motor 500 to an opening and closing action between the two calipers 310, 350 is a worm gear mechanism. More specifically, the threaded rod 600 is in the form of a worm and the second gear 520 is a worm gear in that the center bore 522 thereof includes worm gear threads (teeth) that mesh with the teeth of the worm 600. Rotation of the worm gear 520 drives the worm 600 as described below.

A first end 602 of the worm 600 mates with the worm gear 520, while an opposite end 604 of the worm 600 mates with a second hub 610. The second hub 610 has a cylindrical shape to allow it to seat within the opening 392 formed in the second flange 390 of the second caliper. Thus, the second hub 610 can have a pair of annular shaped flanges at its ends to assist in coupling the second hub 610 to the second flange 390. In particular, when the second hub 610 is coupled to the second flange 390, the two flanges are disposed on the two opposing faces of the second flange 390 of the second caliper 350. The second hub 610 also has a center bore 612 formed therethrough and which can be in the form of a threaded bore to allow the worm 600 to engage (mesh with) the threads of the bore 612.

As best shown in FIGS. 6-9, the worm 600 extends between and is coupled to the two hubs 530, 610 and is thus coupled to the first and second calipers 310, 350.

When assembled, the outer teeth of the second gear 520 mesh with the teeth of the first gear 510 that is part of the drive shaft of the motor 500. As a result, as the motor 500 is driven in a first direction, the first gear 510 rotates in a first direction and rotation is likewise imparted to the worm gear 520. The rotation of the worm gear 520 causes the worm 600 to be driven in a first direction and since the opposite end of the worm 600 is coupled to the other caliper 350, the driving of the worm 600 causes the two second flanges 390 of the calipers 310, 350 to be either drawn closer together (e.g., for applying the brake device) or driven further apart (e.g., for disengaging the brake device). Conversely, when the motor 500 is driven in a second direction, the rotation is likewise imparted to the worm gear 520 and this causes the worm 600 to be driven in a second direction, thereby causing the calipers 310, 350 to move in an opposite direction.

As a result of the electronic motor 500, the brake device 100 can easily be actuated to move the calipers 310, 350 towards one another such that the brake pads 360 are brought into contact with the rim of the tire 30 resulting in the tire 30 being stopped. Conversely, when the calipers 310, 350 are driven away from one another, the brake pads 360 are disengaged from contact with the rim of the tire, thereby allowing the tire to freely rotate again.

In accordance with the present invention, the brake device 100 is part of a remote control system that allows a user, such as a parent, to remotely control the operation of the brake device 100 by transmitting wireless command signals to the brake device 100. For example, the user can remotely cause both the activation of the brake device 100 resulting in brake pads 360 contacting the rim of the tire 30, as well as, the disengagement of the brake device 100, whereby the brake pads 360 are removed from frictional contact with the rim of the tire 30.

FIG. 1 shows the basic components of the remote control system and in particular, a remote control unit 90 is provided and is used to control the operation of the brake device 100. The remote control unit 90 is in the form of a hand-held unit that includes at least one button 92 that controls the operation of the brake device 100. The remote control unit 90 can be in the form of a radio-frequency (RF) remote control that transmits signals to control the operation of the brake device. In embodiments in which multiple command signals are issued and processed into multiple control signals, additional transmission buttons can be provided on the remote control.

Radio-frequency (RF) remote controls are fairly common and are found in garage-door openings, car-alarm fobs, and radio-controlled toys. An RF remote transmits radio waves that correspond to the binary command for the button that is being pushed. A radio receiver on the controlled device receives the signal and decodes it. Due to the vast amount of these type of devices in use, there are a number of radio signals being transmitted through the air at any given time. Cell phone, walkie-talkies, WiFi setups and cordless phones all transmit radio signals at varying frequencies. RF remotes address the interference issue by transmitting at specific radio frequencies and by embedding digital address codes in the radio signal. This lets the radio receiver on the intended device know when to respond to the signal and when to ignore it. One of the advantages of radio-frequency remotes is their range. These remotes can transmit up to 100 feet from the receiver and radio signals can go through walls or other obstructions.

Some circuits such as the XBEE 2 from Digi International can transmit on a line-of-sight basis up to 400 feet outdoors. Presently, the XBEE 2 RF module is a preferred choice of component for inclusion in the remote control 90. The circuitry within the remote control need only have a power supply, a user-control (e.g., one or more buttons), a microcontroller to receive commands from the user via the user-control and instruct the RF module to transmit those commands to the electronic brake 100. The circuitry within the remote control 90 can include conventional supporting circuitry as understood by those of skill in the art.

Since security is not an issue in the present application compared car-alarm fob applications, the remote control can be of a fairly simple design. In particular, the remote controller can include a controller chip and a DIP switch that is soldered to the PCB 201. By setting the DIP switches inside the transmitter, the code that the transmitter sends is controlled. In this way, interference with a second brake device 100 can be avoided by changing the transmission characteristics of one of the devices through the DIP switches. Alternatively, the transmitter can consist of a number of transistors and a number of resistors. A two-transistor design can be powered by batteries 203 and have a simple design such as found in inexpensive walkie-talkies.

The remote control unit 90 thus can include a transmitter and can include one or more buttons to operate the remote control unit 90. A corresponding receiver is part of the brake device 100 and is located in the housing 200.

It will also be appreciated that the remote control unit 90 can be signed to have a single button which when pressed and held in, sends a signal to the brake device 100 to cause actuation of the motor 500. As discussed above, actuation of the motor 500 results in the calipers 310, 350 being moved into the engaged braking position where the brake pads 260 are brought into contact with the rim of the tire 30. This results in stopping of the bicycle. When the user wishes to release the brake device 100 (brake pads 360 moved to a disengaged position), the user simple removes his or her hand from the button so as to remove the force being applied to the button. This causes the motor 500 to rotate in the opposite direction causing the calipers 310, 350 to be driven apart from one another, thereby disengaging the brake pads 360 from the rim of the tire.

Alternatively, the brake device 100 can be disengaged by pressing another button which causes the motor to turn in the opposite direction to cause the calipers 310, 350 to separate. Still another variation is that a single button can be pressed once to engage the brake and pressed again to disengage the brake, in a toggle manner.

In a more advanced design, the remote control unit 90 can have different levels of braking. For example, one button can be pressed to completely brake the bicycle by driving the brake pads 360 into contact with the tire. Another button can send a signal that is processed by the processor to cause engagement of the brake pads 360 with the tire for a select period of time and is then released. This causes the bicycle to be partially braked or slowed down without a complete braking.

In yet another embodiment, the "brake activation" button of the remote can be designed so that it can operate in two different modes, namely, a first mode, similar to above, where the user presses and holds the button down to cause the brake to fully engage and thus, stop the bicycle completely, and a second mode where selective braking occurs. More specifically, for selective braking where the force applied to the brake pad 360 to drive the brake pad into contact with the rim of the tire is increased upon successive pressing of the button. For example, the user can successively press the remote control button to cause the brake pad 360 to be driven into greater frictional contact with the tire rim.

In this embodiment, the motor can be a stepper motor and the remote control circuit can be designed so that successive pressing of the button causes incremental turning of the motor to drive the brake pad toward the rim of the tire. For example, the first press of the button may only result in slight friction between the brake pad 360 and the rim of the tire to a degree where the bicycle is not fully stopped but merely slowed down slightly. Further pressing of this button can cause further and more dramatic slowing down of the bicycle to a point where the bicycle is fully stopped.

There are remote control brake devices on the market; however, these devices suffer from a number of disadvantages, including but not limited to the device being designed so that once it is "fired"/activated to bring the bicycle tire to a stop, the brake device must be manually reset (disengaged) before the bike's tire can freely rotate and the child continue riding. This not only requires the parent to continually walk over to the bicycle and depress the stopper member but it also is frustrating for the child who wishes to be "free" of the parent and feel a sense of pride of riding a bicycle without the assistance of his or her parent.

The present invention overcomes the deficiencies of the prior art by allowing the user to remotely disengage the brake device 100. By simply removing the force being applied to an actuation button, the remote control unit 90 can be placed into a normal operating mode where the calipers 310, 350 are moved and maintained in an open position, thereby allowing normal bicycle riding to occur. Alternatively, the remote control unit 90 can be designed to include a disengagement button whereby when the user presses the disengagement button, a signal is sent to the brake device 100 to cause the motor 500 to rotate in a different direction to cause the worm 600 to move in the opposite direction. This results in the calipers 310, 350 being driven apart (opening), thereby causing the brake pads 360 to disengage from the rim of the tire 30.

It will also be appreciated that other types of remotes can be used including a remote control having a control wheel. By manipulating the wheel, different signals are sent to the unit to cause the calipers to open or close, respectively. In any event, the remote control unit 90 is designed to allow both remote engagement of the brake device 100 and remote disengagement of the brake device 100. In the event that the child is placed in harm's way or the parent wishes to slow down the speed of the child's bicycle, the parent simply actuates the remote control unit to cause activation of the brake device 100.

Another advantage of the brake device 100 is that it can easily be retrofitted onto existing coaster brake bicycles since it is easily mounted using the existing threaded bore (opening) that is formed in the cross member 24. The bolt 400 is threadingly mated therewith to couple the brake device 100 to the frame of the bicycle. This allows the brake device 100 to be simply retrofitted to any existing coaster brake type bicycle.

Now referring to FIGS. 10-15, a remote control (electronic) brake device 700 according to another embodiment is illustrated. The device 700 is similar to the device 100 and includes a number of the same or similar components.

The brake device 700 includes a housing 710 that stores a power source 720 such as batteries or a rechargeable fuel cell in a battery receptacle, with the power source electrically connected to circuitry configured to implement remote, wireless braking of the wheel of a bicycle. The housing 710 also includes an electronically actuated caliper brake assembly 800. The housing 710 includes a first part 730 and a complementary second part 740. The first part 730 can be thought of as a top part, while the second part 740 can be thought of as a bottom part. The second part 740 is a substantially hollow member that defines a first compartment 750 for holding the power source 720 and a second inner compartment 760 for storing other working components of the device 700.

The first compartment 750 is formed along a top of the second part 740 and includes recessed sections that receive one or more batteries 720. The first part 730 is in the form of a cover that is securely attached to the second part 740 to cover and locate the batteries 720. The cover 730 can be an L-shape cover that includes an opening that receives a fastener 731 for securely attaching the cover 730 to the second part 740. The fastener 731 can be in the form of a screw or the like that passes through the cover and is received within a complementary opening (threaded opening) formed in the second part 740.

The caliper assembly 800 includes a number of components that interact and are coupled to one another. The caliper brake assembly 800 includes a first brake caliper 810 and a second brake caliper 850 that is similar to the first brake caliper 810. The first brake caliper 810 includes a first end 812 and an opposing second end 814. The first brake caliper 810 has a first section 815 that terminates at the first end 812 and represents a bent or curved section and a second section 817 that terminates at the second end 814. The second section 817 is substantially perpendicular to the first section 815.

At the first end 812, a first opening 819 is formed and a second opening 821 is formed proximate the first opening 819 and within the first section 815. The second opening 821 represents a pivot point for the first and second brake calipers 810, 850. The opening 821 can have a circular shape.

At the second end 814, an upstanding first flange 820 is formed. The flange 820 includes a slot 830, such as a longitudinal slot. The first flange 820 can be formed perpendicular to the first section 815.

The first and second calipers 810, 850 can be formed of a number of different materials, including metals or other Materials, including rigid plastics.

A brake pad 860 is provided and is intimately inserted into and held within the slot 830. The brake pad 860 can be a conventional brake pad that includes a friction body 870 that is placed in contact with a rim of the tire 30 to cause braking of the bicycle by stopping rotation of the tire 30. The friction body 870 can be a rubber body and the brake pad 860 includes a stem or post 880 that extends radially outward from the friction body 870. The stem 880 is inserted into the slot 830 for coupling the brake pad 860 to the caliper 810, 850. It will be appreciated that the brake pad 860 can be adjusted not only longitudinally along the caliper 810, 850 at the second end 814 by moving the stem 880 longitudinally within the slot 830 but also the brake pad 860 can be pivoted relative to the first caliper 810. For example, the stem 880 has a cylindrical shape and therefore, it can be rotated within the slot 830, thereby permitting the brake pad 860 to also rotate. By allowing the brake pad 860 to be moved longitudinally within the slot 830 and also be pivoted within the slot 830, the brake pad 860 can be adjusted relative to the particular type of tire 30 that is present on the bicycle. More particularly, different bicycles have different tires sizes and therefore, the location of the tire's rim can differ from tire to tire, thereby necessitating some ability to adjust the brake pad 860 relative to the tire 30 to allow a proper fit between the brake and the tire.

As mentioned above, the second caliper 850 is similar to the first caliper 810 and therefore, like elements have been numbered alike. In particular, the second caliper 850 includes many of the same components as the first caliper 810 and therefore, the same components have been numbered the same. The main difference between the first caliper 810 and the second caliper 850 is that the first caliper 810 includes a leg 811 that extends outwardly from the first section 815. The leg 811 can terminate in a planar edge and a slot 813.

Figure 15:
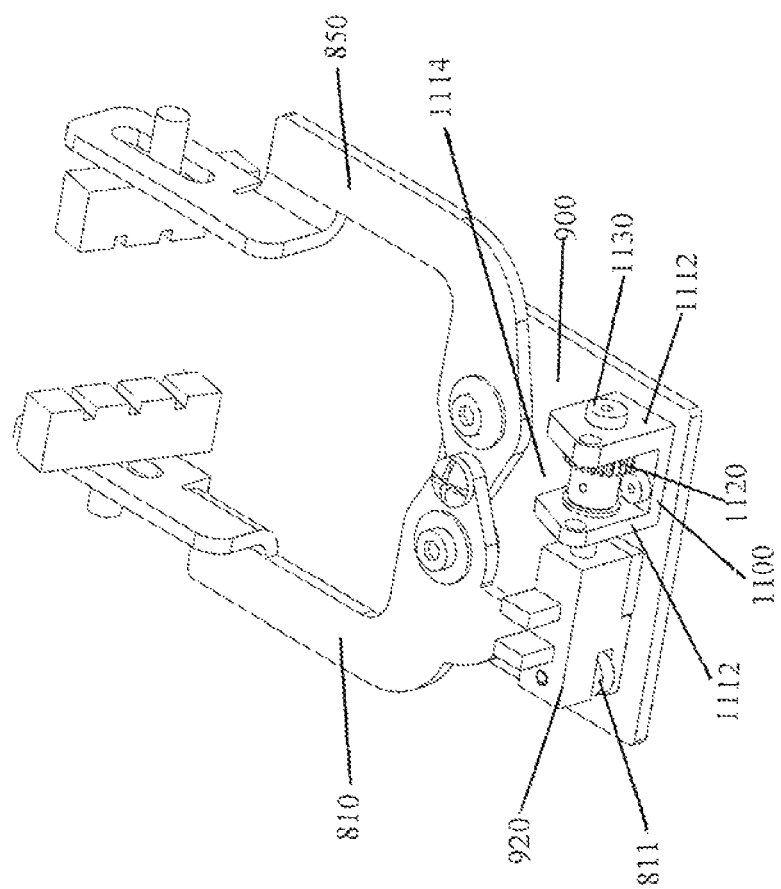
FIG. 15 is a perspective view of the caliper arms and several gear/motor components.

As shown in FIG. 15, when the first and second calipers 810, 850 are mated together, the first caliper 810 is disposed at least partially over the second caliper 850 and in particular, the first section 815 of the first caliper 810 is disposed over the first section 815 of the second caliper 850 such that the first openings 819 of the two calipers are axially aligned with one another. The two calipers 810, 850 are pivotally attached to one another using a fastener 851, such as a pin, as shown. The pin 851 includes a shaft and a head at one end.

The caliper assembly 800 includes a base or support 900 which supports a number of components and also supports the first and second calipers 810, 850. More specifically, the first caliper 810 is pivotally attached to the base 900 using a fastener 910 that passes through the second opening 821. A washer 912 and nut 913 can be used.

On an underside of the support 900, a post 901 is provided and extends outwardly therefrom. The post 901 is axially aligned with the fastener that couples the caliper arms 810, 850 and is between the pair of fasteners used to pivotally connect the caliper arms 810, 850 to the base 900. The post 901 is used to couple the device to the frame of the bicycle. For example, the post 901 can be threaded and a nut can be used to securely attach the device 700 to the bicycle.

The support 900 also supports the other working components of the device 700. For example, a slider 920 is provided for coupling to the driven caliper arm 810 and to regulate the driving of the caliper arm 810. As mentioned above, the caliper arms 810, 850 are not identical but rather the first caliper arm 810 can be thought of as a driven caliper arm 810, while the second arm 850 is a slave caliper arm that is driven by the driving action of the caliper arm 810. The slider 920 is in the form of a block that has a top surface 922, a bottom surface 923, a first end 924 and a second end 926.

The bottom surface 922 is not a flat continuous surface but include a notch 925 formed therein at second end 926 so as to define a stepped surface. Within the notch 925, a plate or wafer 940 is provided. The plate 940 is generally square shaped and includes a protrusion 944 formed on a top surface 942 thereof. In the illustrated embodiment, the protrusion 944 is also square shaped and is formed in one corner of the top surface 942. The plate 940 is fixed to the support 900 and the slider 920 is received thereover with the plate 940 being received within the notch 925 of the slider 920. As mentioned above, the slider 920 moves (slides) in a linear manner across the support 900 and relative to the plate 940 fixed thereon. The movement of the slider 920 is discussed below in more detail.

At the first end 926 of the slider 920, a slot 950 is formed and a pin hole 960 is formed in the top surface of the slider 920 and is in communication with the slot 950. The leg 811 is received within the slot 950 of the slider 920 and a coupling member, such as a fastener or pin 975, is received through the pin hole 960 to hold the first caliper arm 810 to the slider 920. The pin 975 can pass through the slot 813 of the leg 811 to permit pivoting of the caliper 810. In other words, the pin or fasteners fixes first caliper arm 810 the slider 920 such that linear movement of the slider 920 is translated into pivoting of the first caliper arm 810. For example, when the slider 920 moves linearly away from the fixed plate 940 and toward one edge of the support 900, the first caliper 810 pivots so as to close the first caliper arm 810.

The top surface of the slider 920 includes a pair of upstanding fingers 970, 972. The fingers 970, 972 are spaced from one another to define a space 975. The fingers 970, 972 can be square shaped. The slider 920 includes a bore 980 formed therein that is open at the second end 926 and is in communication with the slot 950.

As mentioned above, the device 700 is a motorized unit and includes a motor and gear assembly 1000. For example, the assembly 1000 can be an electric motor based unit that can be driven in two opposite directions.

The assembly 1000 includes a number of different components including a motor 1010. The motor 1010 is electrically connected to both the power supply and the electronic controller (PCB) and is mounted on the support 900 proximate the slider 920. Any number of conventional electric motors can be used including a stepper motor or other type of electric motor that can be controllably driven in two directions with precision.

A first gear holder 1100 is fixed to the top surface of the support 900 adjacent the slider 920. The first holder 1100 includes a pair of upstanding end walls 1112 with a space 1114 formed therebetween. The space 1114 receives a first gear 1120 with the gear 1120 being held above the floor of the holder 1100. The gear 1120 has a central bore 1122 formed therethrough. The first gear 1120 has a toothed end 1125. The upstanding end walls 1112 include axially aligned openings with a slider drive shaft (worm) 1130 being disposed through one set of openings. The drive shaft 1130 passes through the bore 1122 formed in the gear 1120. As a result, the drive shaft 1130 and gear 1120 are coupled to one another such that rotation of the gear 1120 is translated into rotation of the drive shaft 1130. The drive shaft 1130 extends through and beyond the holder 1100 and a distal end of the drive shaft 1130 is coupled to the slider by passing through the opening formed in the second end thereof. It will be appreciated that as the drive shaft 1130 is rotated in a first direction, the shaft 1130 advances in a direction toward the slider 920 and this causes a linear driving action to be imparted-to the slider 920. In other words, the slider 920 is driven in a direction away from the holder 1100 causing a closing of the caliper arm 810. Conversely, when the motor is actuated and rotates in an opposite direction, the opposite rotation of the gear 1120 and drive shaft 1130 causes the drive shaft 1130 to be retracted in a direction away from the slider 92D causing the slider 920 to move linearly toward the holder 1100 and thus open the caliper arm 810.

It will be appreciated that the gear arrangement of the present invention is intended to "step down" the speed at which the motor operates since in use, the device 700 should work smoothly and operate at slower speeds to allow a controlled, smooth braking operation as opposed to a sudden, violent braking action. In one embodiment, the gear arrangement "steps down" the speed of the motor by about 75%. The permits the slider 920 to be moved linearly in a controlled, smooth manner.

Figure 12:
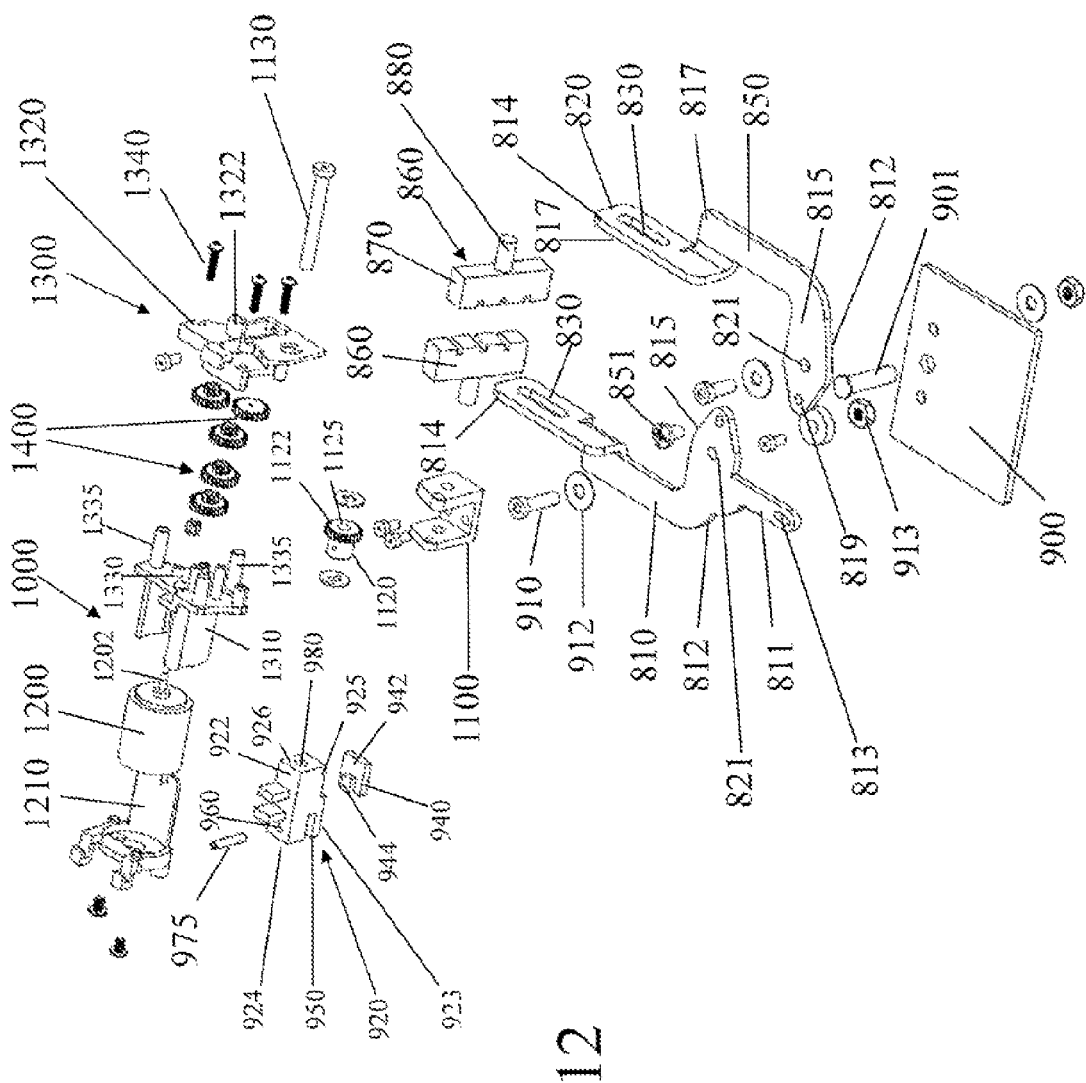
FIG. 12 is an exploded perspective view of a motor and caliper assembly of the device of FIG. 10.

FIG. 12 shows other components that form the gear and motor assembly 1000. For example, the assembly 1000 includes a motor 1200 that is held within a holder 1210. The electric motor 1200 includes a rotating shaft 1202. The assembly 1000 further includes a number of gear components that intimately engage one another and are operatively coupled to the rotating shaft 1202 of the motor 1200. The gear components include a gear housing 1300 that is formed of a first part 1310 and a second part 1320 that mates with the first part 1310. The first part 1310 includes a number of fingers or boss elements 1330 that extend outwardly therefrom and have threaded bores formed therein to permit a plurality of fasteners 1340 to be used to securely attach the second part 1320 to the first part 1310. The second part 1320 is thus complementary to the first part 1310 and includes a plurality of openings 1322 through which the fasteners 1340 pass through. Between the two parts 1310, 1320, a plurality of gears 1400 are disposed and are securely and rotatably held between protrusions or bosses 1335 that are formed on inner surfaces of the two parts 1310, 1320. In other words, the gears have a center hole that receive the protrusions (that act as pins) when the first and second parts 1310, 1320 are coupled to one another. In this manner, each gear 1400 can freely rotate within the housing. Since the protrusions of the two parts 1310, 1320 are formed at different locations and different heights, etc., the gears 1400 can be disposed and held in select locations that permit the proper meshing of the teeth of one gear with the teeth of another. One of the gears 1400 is coupled to the shaft 1202 of the motor and therefore, this gear rotates when the shaft 1202 is driven by the motor. The other gears 1400 are arranged so that the rotation of the gear on the shaft 1202 imparts rotation to the other gears.

As shown in the figures, the gears 1400 are arranged so that one of the gears 1400 is coupled to the first gear 1120 that is coupled to the drive shaft 1130 that itself is coupled to and causes linear motion of the slider 920.

It will be appreciated that the arrangement of gears 1400 as shown is merely exemplary in nature and other gear arrangements are possible so long as operation of the motor 1200 drive the slider 920 in a linear motion (in two directions), thereby permitting both the closing and opening of the first caliper arm 810. For example, the gears 1400 can be in the form of an arrangement of planetary gears as opposed to and as an alternate to the arrangement of gears described and illustrated herein.

Figure 13:
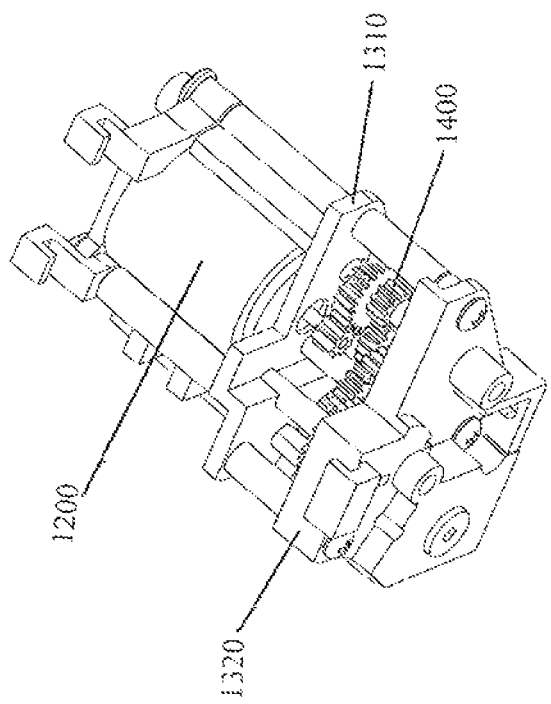
FIG. 13 is a perspective view of the motor and gear assembly in an assembled state.

FIG. 13 shows the fully assembled motor and gear assembly. This assembled unit can be easily and conveniently mounted to the support 900 using conventional techniques including the use of fasteners or pins that are received into holes in the support 900. In FIG. 13, only a small portion of the slider 920 is visible.

Figure 14:
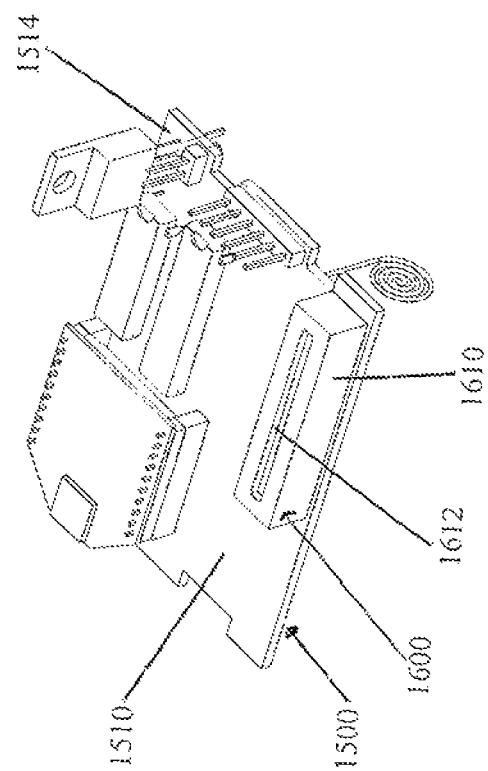
FIG. 14 is a perspective view of a printed circuit board assembly for use in the device of FIG. 10.

FIG. 14 shows a controller 1500 in the form of a printed circuit board that includes a number of electronic components. The controller 1500 includes a main printed circuit board 1510 that has a top surface 1512 and a bottom surface 1514. Most of the electronics are disposed along the bottom surface 1514 with the exception of battery contacts 1520 that are disposed along the top surface 1512, while electrical traces are supported on both sides of the PCB in a conventional manner to electrically connect the components that comprise the circuitry. When batteries are inserted into their respective compartments, the batteries make contact with these contacts 1520.

Figure 14A:
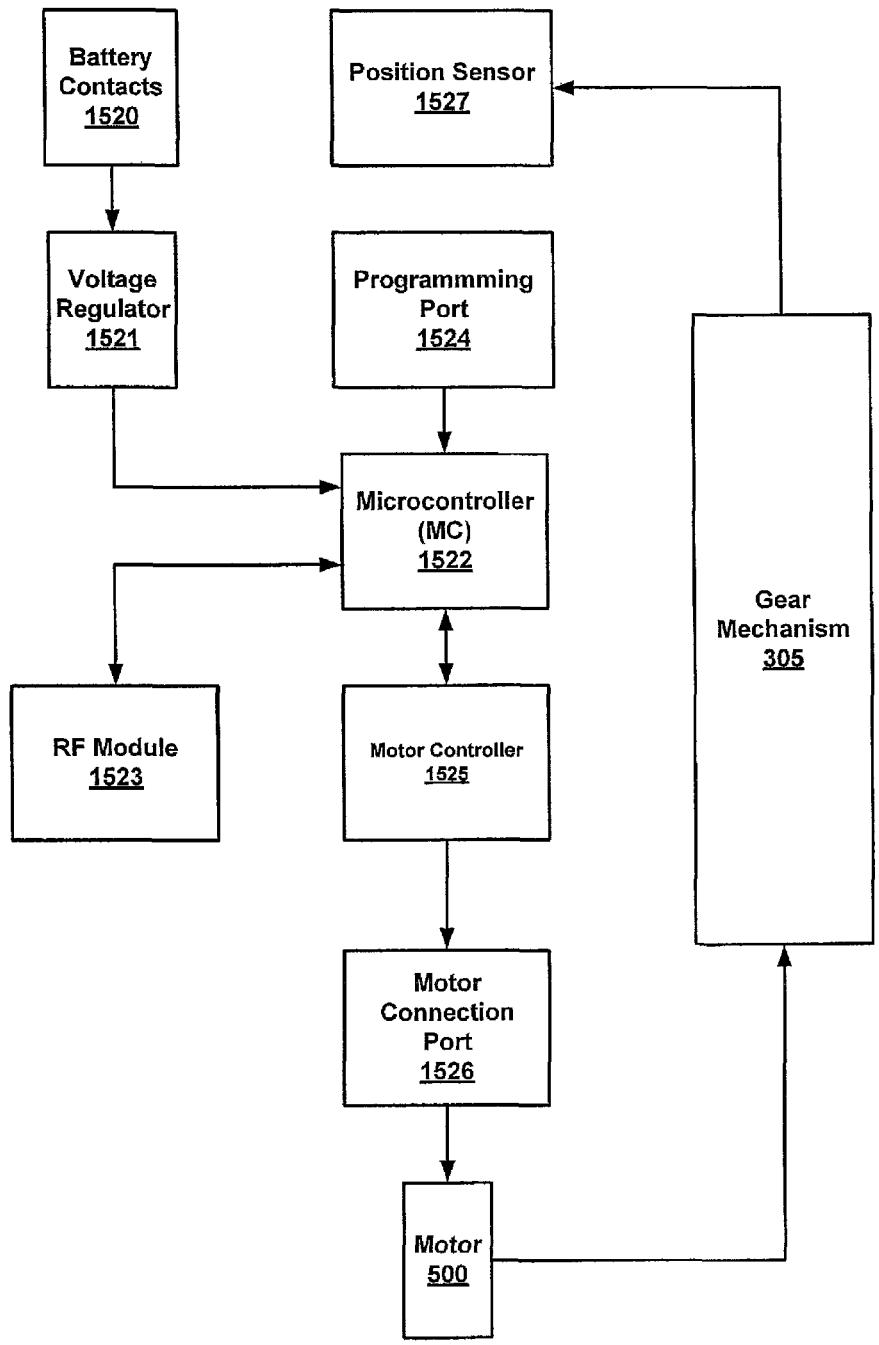
FIG. 14A is a block diagram of a circuit that can be used in the device of FIG. 10.

With reference now to the block diagram of FIG. 14A, battery contacts 1520 provide an electrical path from batteries (e.g., 3 or 4 AA batteries) to power the remaining circuitry on the PCB 1510. A voltage regulator 1521 provides regulated voltage, for example, 3.3 volts, to downstream circuits such as a microcontroller 1522 and a radio receiver circuit 1523. Other components can be driven by the same or a different regulated voltage. As can be seen in FIG. 14A, the circuit that supports operation of the braking device described herein can comprise several integrated circuits (ICs), but also can be comprise fewer or additional ICs. In an arrangement in which several ICs are used, the microcontroller 1522 is programmed to govern operation of the motor 500, including its direction and degree of movement as well as the amount of movement, if any. The microcontroller can be, for example, the PIC 16F690 microcontroller which supports an instruction set suitable for controlling the motor 500 and which has a wide operating voltage range of 2.0 to 5.5 volts and includes onboard EEPROM data memory, among other features. The microcontroller has instructions loaded via a connection to a programming port 1524. A conventional computer such as a personal computer connects to the program port and transfers instructions (software) into the memory of the microcontroller 1522. The software can be updated in existing units or future production runs, for example, to support a different motor 500, a different radio receiver 1523 or to add to or improve on existing functionality of the braking device 100.

The radio receiver IC 1523 can comprise an RF module that can receive data from a remote device, such as the remote control used by a parent to control the braking device 100. One suitable IC for use as the RF module is the XBEE 2 from Digi International, Inc. This module operates within the ZigBee protocol provides a low-power RF receiver that operates within the ISM 2.4 GHz frequency band for outdoor (line-ofsight) distances of up to about 400 feet. The RF module of the illustrated embodiment receives commands from a user in the form of radio-transmitted signals from the remote control 90, via the Zigbee protocol. The RF module 1523 then communicates those commands via a UART port of the microcontroller 1522.

The microcontroller 1522 processes the command signals in accordance with the software that has been uploaded and stored therein. The command signals, as noted previously, can comprise apply or release the brake, or partially apply or partially release the brake. Depending on the command signal, the microcontroller selectively issues an instruction to a motor controller IC 1525. Any number of motor controllers can be used, but preferably, the motor controller implements an H-bridge switching circuit so that a D.C. voltage can be applied to the motor in two different polarities and thereby effect motor actuation in two directions. The motor controller can connect directly to the motor 500 or via a motor connection port 1526 which provides contacts that can be connected to leads extending from the motor to permit assembly of the motor and gear components prior to connection of the PCB 1510 and its supported circuitry. The voltage provided by the motor controller 1525 can be a regulated voltage, such as noted above, or can be a greater voltage such as 5 volts or so. The motor 500 is a D.C. motor, such as a Mabuchi RC 260-Ra 18130 motor available from the Mabuchi Motor Co., Ltd. of Japan.

Preferably, movement of the brakes (e.g., brake calipers or the gear mechanism 305 to which they are coupled) in either direction is associated with a linear potentiometer 1527 that provides position-feedback data to the microcontroller 1522. The position-feedback data provides dynamic information on brake position that the software preferably uses in comparison to its internal state information to determined, for example, whether the motor has been driven sufficiently to give effect to a command signal from the remote control. More particularly, and by way of example only, if the command signal is to iteratively apply the brake mechanism to slow but not stop the bicycle, the microcontroller can use the position-feedback data to first discern the present location of the braking mechanism, issue a command to the motor controller to drive the brake in a first direction, monitor the position-feedback data until a set amount of brake movement has been achieved, and then issue a further command to the motor controller to cease movement of the motor 500. Many variations can be envisioned such as a timing circuit to allow the motor to free run for a period of time (e.g., 0.5 second), followed by stopping the motor, calculating brake movement, and selectively issuing a further motor-drive signal, but the key point in this regard is that the position-feedback data, unlike prior art devices, provides a parameter by which electronic-logic is utilized to not merely apply the brakes until the bicycle is stopped, but which can provide a measured, controlled movement of the brake pads.

Figure 11:
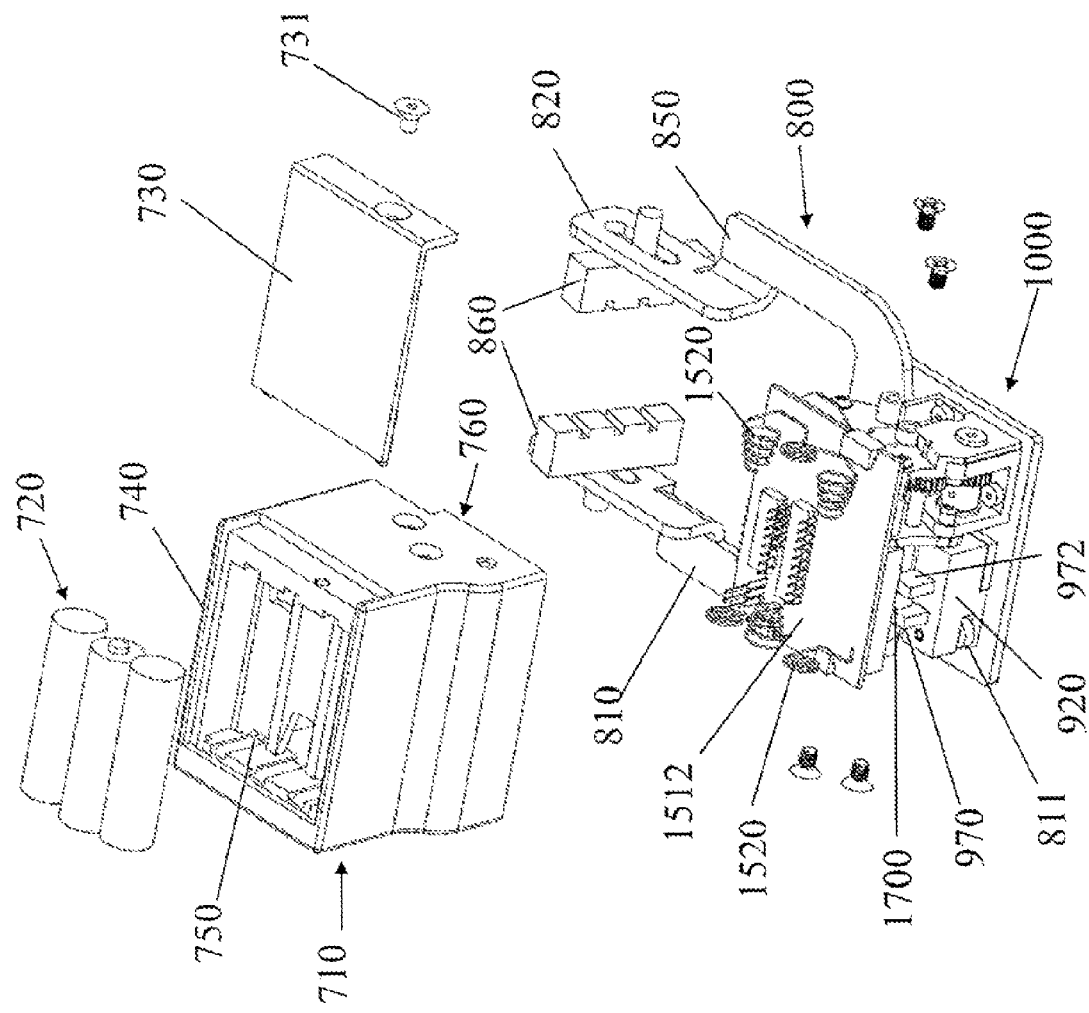
FIG. 11 is an exploded perspective view of the components of the remote control brake device of FIG. 10.

As shown in FIGS. 11 and 14, the device 700 includes a locating or sensor feature 1600 that permits the location of the slider 920 to be readily known and tracked. As a result, the position of the driven caliper arm 810 is likewise known. The locating feature 1600 includes a block 1610 that is disposed along the bottom surface 1514 along one edge thereof. The block 1610 has a guide Channel or track 1612 formed therein. As shown, the track 1612 is a linear track formed along the length of the block and thus parallel to the one edge of the block 1610.

The locating feature 1600 also includes a movable tab or finger 1700 that is disposed at one end within the space 975 formed between the fingers 970, 972 and is disposed at another end within the track 1612. In the illustrated embodiment, the tab 1700 is oriented vertically (upstanding) and extends between and thus couples the slider 920 to the block 1610. The block 1610 is fixed in place on the printed circuit board, while the slider 920 moves linearly as discussed above. As a result, when the slider 920 moves linearly, the location of the tab 1700 within the track 1612 changes. It will be appreciated that there is a relationship between the location of the slider 920, the first caliper arm 810 and the tab 1700. By sensing the location of the tab 1700 within the track 1612, the precise position of the slider 920 is determined and since the first caliper arm 810 is coupled to and pivoted by motion of the slider 920, the precise location of the caliper arm 810 can be determined.

The controller 1500 is securely coupled to the gear and motor assembly 1000 and as shown, is disposed across the top of the assembly 1000. This entire structure is inserted into the hollow compartment defined by the second part 740 of the housing 710 and as mentioned before is fixed to the support 900.

The operation of the device 700 is similar to the device 100 and typically the device 700 is initially set so that the device 700, when initially powered on, closes the two caliper arms 810, 850 so as to set a limit and mark the location of the tab 1700 within the track 1612 when the caliper arms are engaged and fully closed (a braking condition). The controller 1500 can then be configured to open the caliper arms 810, 850 a predetermined distance so as to remove the brake pads from engagement with the wheel rim and permit free rotation of the wheel. In other words, the initial automatic closing action defines one end of the degree of travel of both the slider 920 and the coupled tab 1700 and the controller 1500 then is programmed to slightly open the caliper arms. This opening action is highly controllable with a high degree of precision (e.g., by controlling the steps of a stepper motor).

Since there are different sized wheels, the initial setting operation in effect calibrates the system and defines the limits of travel of the caliper arms.

As shown in FIG. 10, a pin hole 1800 can be provided in the second part 740 of the housing 710 to allow insertion of a tool (e.g., alien wrench) to open or close the housing.

The operation of the device 700 is the same or identical to the operation of the device 100 in that a remote control is used to control the operation of the device 700. The device 700 is installed on the bicycle and then as described earlier when the device 700 is initially operated, the two calipers 810, 850 close until contact is made with the rim of the wheel. Once this action is sensed (e.g., movement of the slider 920 in one direction ceases), then the engaged position is recorded and can be stored in memory of the like. This engaged position is the position that will result in the braking of the wheel. The controller 1500 is then configured to effectively back the calipers 810, 850 off the rim by operating the motor in an opposite direction, thereby causing the slider 920 to move in a direction that causes the opening of the caliper arms 810, 850 a predetermined distance. When the user activates the remote control, the caliper arms 810, 850 are slowly driven into the engaged position where the brake pads contact the rim causing the stopping of the bicycle.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A remote-controlled electronic brake device for use with a wheel of a bicycle, comprising:

an electronic brake assembly including:
- a housing that is configured for being detachably attached to a frame of the bicycle;
- a receiver configured to receive a command signal;
- a processor disposed within the housing and operative to identify the received command signal and to output a first control signal in response to the command signal being identified as a first command signal;
- a first brake caliper that includes a brake pad;
- a second brake caliper that includes a brake pad, the first and second brake calipers being pivotally coupled to one another and at least one of the first and second brake calipers being further coupled to the housing, with both the first and second brake calipers being at least partially contained within the housing, whereby pivoting of the first caliper under an applied force is translated into pivoting of the second caliper;
- an electric motor disposed within the housing; a gear mechanism that is intimately coupled to the electric motor and is coupled to the first brake caliper, whereby activation of the electric motor drives the gear mechanism to cause the first and second brake calipers to move between an engaged position and a disengaged position; and
- a remote control unit that is configured to issue one or more command signals that remotely activate the electric motor so as to cause the brake calipers to move between the engaged position and the disengaged position;
- wherein the housing contains the first and second brake calipers, the processor, and the electric motor so as to form the remote-controlled electronic brake device that is configured for attachment as a unit to the frame of the bicycle proximate the tire;
- wherein the first brake caliper includes an integral elongated extension that extends outwardly therefrom and is received within a slot formed in a slider and is pivotally coupled to the slider, the slider being contained within the housing and operatively coupled to the gear mechanism such that operation of the motor in a first mode causes the slider to move linearly in a first direction and operation of the motor in a second mode causes the slider to move linearly in an opposite second direction, whereby linear movement of the slider is translated into pivoting of the first brake caliper.

2. The remote-controlled electronic brake device of claim 1, wherein the first and second brake calipers pivot about a pivot that is coupled to the housing and the pivot comprises pin that passes through axially aligned openings formed in the first and second calipers proximate the first ends thereof.

3. The remote-controlled electronic brake device of claim 2, wherein a free end of the pin passes through an opening in a floor of the housing and is accessible for attaching the brake device to a frame component of the bicycle.

4. The remote-controlled electronic brake device of claim 1, further including a circuit contained within the housing and being configured to receive a remote command signal and activate the electric motor, wherein the circuit further comprises a battery receptacle and a processor, the processor being configured by software to receive the remote command signal and issue control signals in response thereto.

5. The remote-controlled electronic brake device of claim 1, wherein in the engaged position, the brake pads of the first and second brake calipers are closest together and in the disengaged position, the brake pads spaced further from one another than in the engaged position.

6. The remote-controlled electronic brake device of claim 1, wherein each brake pad is adjustable both longitudinally and pivotally relative to a respective caliper that it is coupled to.

7. The remote-controlled electronic brake device of claim 1, wherein linear movement of the slider in the first direction causes the caliper arms to pivot to the engaged position and linear movement in the second direction causes the caliper arms to pivot to the disengaged position.

8. The remote-controlled electronic brake device of claim 1, further including: a guide block that includes a guide channel formed therein, the guide block being in communication with the processor; and a locating tab that is coupled to the slider and is disposed within the guide channel; wherein the processor is configured to determine the location of the tab within the guide channel and accordingly, a position of the first caliper is determinable.

9. The remote-controlled electronic brake device of claim 1, wherein the first caliper is a driven caliper while the second caliper is a slave caliper that pivots in response to the driven pivoting of the first caliper.

10. The remote-controlled electronic brake device of claim 1, further comprising a position sensor in association with the gear mechanism and operative to output position-feedback data to the processor.

11. The remote-controlled electronic brake device of claim 1, wherein the processor is configured such that in an initial install position, the first and second brake calipers undergo a calibration process in which the first and second brake calipers are driven until contact is made with the wheel of the bicycle and upon contact with the wheel, a position of the first and second calipers is determined and stored in memory as the engaged position.

12. The remote-controlled electronic brake device of claim 1, further including a sensing mechanism that includes a first part that is fixed relative to the housing and a second part that is movable relative thereto, the sensing mechanism being in communication with the processor and is configured to determine a position of the first caliper.

* * * * *